United States Patent
Liu et al.

(10) Patent No.: US 9,390,115 B2
(45) Date of Patent: Jul. 12, 2016

(54) TABLES WITH UNLIMITED NUMBER OF SPARSE COLUMNS AND TECHNIQUES FOR AN EFFICIENT IMPLEMENTATION

(71) Applicant: Oracle International Corporation, Redwood Shores, CA (US)

(72) Inventors: Zhen Hua Liu, San Mateo, CA (US); Dieter Gawlick, Palo Alto, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 210 days.

(21) Appl. No.: 14/052,622

(22) Filed: Oct. 11, 2013

(65) Prior Publication Data
US 2015/0106382 A1 Apr. 16, 2015

(51) Int. Cl.
*G06F 17/30* (2006.01)
(52) U.S. Cl.
CPC .... *G06F 17/30315* (2013.01); *G06F 17/30339* (2013.01); *G06F 17/30424* (2013.01)
(58) Field of Classification Search
CPC ............. G06F 17/30315; G06F 17/30321; G06F 17/30337; G06F 17/30339; G06F 17/30424; G06F 17/30327
See application file for complete search history.

(56) References Cited

U.S. PATENT DOCUMENTS

| | | | | |
|---|---|---|---|---|
| 5,963,642 A * | 10/1999 | Goldstein | ......... | G06F 17/30336 380/28 |
| 2004/0148308 A1 * | 7/2004 | Rajan | ................ | G06F 17/30595 |
| 2008/0040365 A1 * | 2/2008 | Harvey | ............. | G06F 17/30595 |
| 2008/0114733 A1 * | 5/2008 | Friesenhahn | ..... | G06F 17/30321 |
| 2009/0254516 A1 * | 10/2009 | Meiyyappan | ..... | G06F 17/30492 |
| 2009/0254532 A1 * | 10/2009 | Yang | ................. | G06F 17/30315 |
| 2010/0036864 A1 * | 2/2010 | Augenstein | ....... | G06F 17/30336 707/696 |
| 2012/0179698 A1 * | 7/2012 | Muras | ............... | G06F 17/30292 707/752 |
| 2015/0088924 A1 * | 3/2015 | Abadi | ............... | G06F 17/30979 707/769 |

OTHER PUBLICATIONS

Seth Delconte, NULL-Friendly:Using Sparse Columns and Column Sets in SQL Server, Jul. 10, 2012, pp. 1-10.*

* cited by examiner

*Primary Examiner* — Leslie Wong
(74) *Attorney, Agent, or Firm* — Hickman Palermo Becker Bingham; Marcel K. Bingham (57) ABSTRACT

A method and apparatus queries a table in a database where the table includes at least one column declared to be sparse. A binary large object may be used to store the sparse column data. The object includes a column-id and column-value pair for each non-null value. To answer a query with a constraint on a sparse column, the object is searched for one or more column ids to obtain the column values. Rows whose column values match a constraint are returned. In another embodiment, an internal table is used. Each tuple in the internal table has a column id and a value array indexed by an ordinal row number. To answer a query with a constraint on a sparse column, the column value in the internal table is found and matched against the constraint. If the match is successful, the index of the column value in the internal table is returned.

20 Claims, 7 Drawing Sheets

100

| | 102 | 104 | 106 | 108 | 110 | 112 |
|---|---|---|---|---|---|---|
| 114 | id | weight | height | shoesize | creditscore | name |
| 116 | 456 | 128 | NULL | NULL | NULL | John |
| 118 | 987 | 114 | '5-8' | NULL | NULL | Joe |
| | | | | | | | person

150

| | 122 | 124 | 126 |
|---|---|---|---|
| 128 | id | name | BLOB Column |
| 130 | 456 | John | (2, 3, 128)<br>(3, _, NULL)<br>(4, _, NULL)<br>(5, _, NULL) |
| 132 | 987 | Joe | (2, 3, 114)<br>(3, _, '5-8')<br>(4, _, NULL)<br>(5, _, NULL) |
| | | | |

300
Person

| row_id | name | weight | height | shoesize | credit score | |
|---|---|---|---|---|---|---|
| 0 | John | 128 | NULL | NULL | NULL | ~302 |
| 1 | Mary | 114 | '5-8' | 4 | 600 | ~304 |
| 2 | George | NULL | NULL | NULL | NULL | ~306 |
| 3 | Alexander | NULL | NULL | NULL | NULL | ~308 |
| 4 | Louis | NULL | NULL | NULL | NULL | ~310 |
| 5 | Charles | NULL | NULL | NULL | NULL | ~312 |
| ⋮ | ⋮ | ⋮ | ⋮ | ⋮ | ⋮ | |

Columns: 314, 316, 318, 320, 322, 324

350  ITAB

| column id | array[row_id] | |
|---|---|---|
| 2 | [128, 114, NULL, NULL, NULL, NULL] | ~332 |
| 3 | [NULL, '5-8', NULL, NULL, NULL, NULL] | ~334 |
| 4 | [NULL, 4, NULL, NULL, NULL, NULL] | ~336 |
| 5 | [NULL, 600, NULL, NULL, NULL, NULL] | ~338 |
| ⋮ | ⋮ | |

Columns: 340, 342 (~330)

TABLES WITH UNLIMITED NUMBER OF SPARSE COLUMNS AND TECHNIQUES FOR AN EFFICIENT IMPLEMENTATION

FIELD OF THE INVENTION

The present invention relates generally to storage and querying of database data managed by a database managements system ("DBMS"), and more particularly to storage and querying of tables with sparse columns.

BACKGROUND

In a relational DBMS, data is contained in one or more relations, where a relation comprises a relation schema and a relation instance. The relation instance is a table and the relation schema describes properties of the table. Specifically, the relation schema may specify a name of the relation, a name of each field (or column), and a domain of each field, where the domain is a data type and/or a set of values. The relation instance is a set of tuples with each tuple having fields meeting the specifications in the relation schema.

For example, suppose the database includes a table called "person". The relation schema for the table is personSchema:={(id; number), (name, varchar2(50)), (weight; number), (height; number), (shoesize; number), (creditscore; number)}, where the first item in each pair of the set is the name of the field and the second item is the domain of the field. Thus, the table, shown below, is the set of tuples with values for the fields whose names and domains were specified by the relation schema.

TABLE 1

| id  | name  | weight  | height  | shoesize  | creditscore  |
|-----|-------|---------|---------|-----------|--------------|
| id1 | name1 | weight1 | height1 | shoesize1 | creditscore1 |
| id2 | name2 | weight2 | height2 | shoesize2 | creditscore2 |

Databases often store a relation instance or table as logical collections of tuples or records, where each collection is a data block in a data storage structure, such as a file. There are several ways to store the tuples in a data block. One way is "row" format, in which the values for the fields of a particular tuple are stored sequentially within an address space of the data block. Another way is "columnar" format, in which values in a particular column for all of the tuples in a data block are stored sequentially in the address space of the data block.

Sparse columns in tables are columns having few non-NULL entries. Such tables create inefficiencies both in storing the table and in accessing the table to answer a query. The kind of inefficiency depends on the format in which the table is stored. For example, if a table with sparse columns is stored in row format, the format wastes storage space because the records have columns filled with mostly NULL values. In addition, in a particular implementation, the row format may place a limit on the number of columns permitted for a table, thus preventing the table from representing all the data. If a table with sparse columns is stored in columnar format, the records waste less storage, but require more computation to retrieve and collect together the several columns for a particular row.

Approaches to address the limitations and inefficiencies of storing and accessing tables with sparse columns have been implemented on the user side of a DBMS. These user-side approaches include a flex-field approach and a name-value pair approach. In the flex-field approach, a set of spare columns is overloaded with different attributes for different rows. For example, a spare column X may hold a "weight" attribute for one row and a "shoesize" attribute for a different row. A database application maintains logic to map the attributes to the physical spare columns depending on the particular row and to generate a proper database statement to query the correct spare columns when a query involves a sparse column. In addition, spare columns of different built-in data types, such as number, varchar, data, timestamp, interval, are needed because data for sparse columns may have different types. In this approach, the main drawback is writing queries for common attributes and different queries for sparse attributes.

In the name-value pair approach, each non-NULL column of a tuple in a table is stored as a row of a table with three columns, (1) row id, (2) attribute name, and (3) attribute value, as shown below.

| row_id | attribute_name | attribute_value |
|--------|----------------|-----------------|
| row1   | attr1          | val1            |
| row1   | attr2          | val2            |
| row1   | attr3          | val3            |
| row1   | attr4          | val4            |
| row2   | attr1          | val1            |
| row2   | attr2          | val2            |
| row2   | attr5          | val5            |
| row2   | attr6          | val6            |
| row3   | attr1          | val31           |
| row3   | attr6          | val36           |
| row3   | attr7          | val7            |
| row3   | attr8          | val8            |

Querying relations in this approach require a potentially large number of self-joins. For example, a multi-column-value search query, such as the one below, needs to return rows that satisfy the predicate in the WHERE clause, which requires two self-joins of the table, one for attr1='val1' and one for attr2='val2'.

```
SELECT row_id
FROM triple t1, triple t2
WHERE       t1.row_id = t2.row_id AND
            t1.name = 'attr1' AND t1.value = 'val1' AND
            t2.name = 'attr2' AND t2.value = 'val2'
```

In general, the number of self-joins is equal to the number of column-value search pairs in the query. A query with many of these self-joins causes the query execution time to increase substantially.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for a user to declare in a database language, such as the Structured Query Language (SQL), that a column is a sparse column. In response to receiving a declaration declaring that columns for a table are sparse, a DBMS stores the sparse columns using native functionality of a DBMS. Such native capabilities provide not only for efficient storage of sparse columns, but for efficient querying of the sparse columns. In addition, the ability to implement a sparse column by simply declaring it as such to a DBMS relieves end users of a DBMS of the burden and complexity of developing user-side implementations such as those discussed previously.

Sparse columns are stored in a single column referred to as a composite column. A composite column holds the values of multiple sparse columns. According to an embodiment, a sparse column is implemented as a binary-large-object (BLOB) column or a character large binary object (CLOB) column. The present invention is, however, not limited to a composite column that is a BLOB or a CLOB type column.

A column id is associated with each sparse column declared for a table. A column value for a sparse column and its column id are stored in a composite column in association with each other as a column-id-value pair. The native functionality of a DBMS stores column values of a sparse column in a composite column as column-id-value pairs and reads the column-id-value pairs in the composite column to retrieve values for a sparse column required by a database statement.

In another embodiment, a sparse column that is declared for a "base table" is implemented in a hidden table separate from the base table. The hidden table contains a row for each sparse column of the base table. For each sparse column and its corresponding row in the hidden table, the column values of the sparse column are stored in a list or single dimensional array stored in the row.

Description

DDL for Declaring Sparse Columns

A data declaration construct is added to a database language to define sparse columns, as shown below. The data declaration includes the keyword SPARSE to declare a column as sparse, as illustrated below.

```
CREATE table person (
    id number,
    name varchar2(50),
    weight number SPARSE,
    height number SPARSE,
    shoesize number SPARSE,
    creditscore number SPARSE
    ...
)
```

Figure 1:
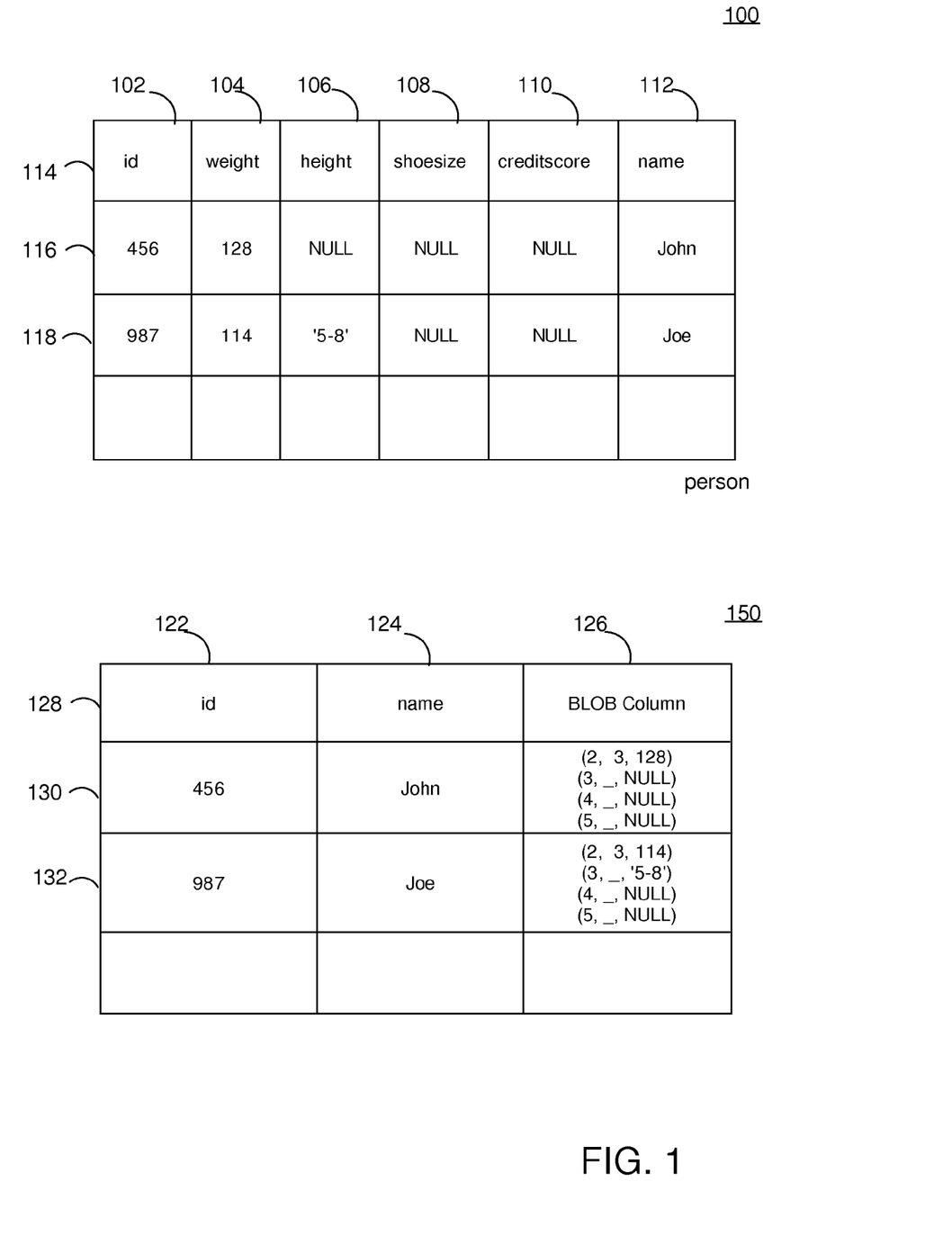
FIG. 1 depicts a typical database table and a database table with a composite column according to an embodiment of the present invention.

The table created by the above data definition language ("DDL") declaration is depicted as table 100 in FIG. 1. Table 100 has columns 102, 104, 106, 108, 110, 112 and rows 114, 116, 118. Columns 104, 106, 108, and 110 are declared to be sparse columns. The DDL language construct for defining sparse columns is similar to that used for defining regular columns, so that users can alter an existing table to add any number of sparse columns. Each column that is declared to be sparse is assigned a unique column id.

Composite Columns

In one embodiment, when columns are declared to be a sparse column in a DDL statement, then the column values of sparse columns of a row are stored in column-id-value tuples in a hidden composite column 126, as depicted table 150 in FIG. 1. The table 150 has columns 122, 124, 126 and rows 130 and 132.

Each column-id-value pair in the composite column is formatted as a tuple (column-id, length*, value) comprising a column-id field, a length* field that is optional, and a value field. The column-id is the unique id of the sparse column in the table. According to an embodiment, assignment of a column id to a sparse column is the same as that of a regular column. The length* field is present to specify the size of data types whose length is variable and is omitted for data types whose size is fixed and thus known. For example, if the data length is ub4 (unsigned short, 32 bits) or ub8 (unsigned long, 64 bits) integer type, or ub4 float type, or ub8 double type, the length field is omitted to save space. The value in the tuple may use the storage format of the data type in the same way as that for regular columns.

Referring to FIG. 1, composite column 126, for row 130 contains tuples for column ids 2, 3, 4, and 5, as follows (2, 3, 128), (3, _, NULL), (4, _, NULL), and (5, _, NULL), respectively, and for row 132, contains tuples column ids 2, 3, 4, and 5 as follows (2, 3, 114), (3, _, '5-8'), (4, _, NULL), and (5, _, NULL), respectively.

Compilation of a database statement referencing a sparse column generates execution plans with execution plan operators that, when executed, read the composite column content and fetch the desired column values by decoding the column-id-value tuples stored therein. Linking structures, such as offsets, can be built within a composite column when the tuple sequence is very long. The jumping structures provide an offset into the BLOB for specific ranges of column ids.

In one version, a base table having a sparse column is implicitly altered to store row ids so that each row of the table can be uniquely identified by a row id. According to an embodiment, a sequence object is used to generate an ordinal number as an ordinal row id. The row id is stored in a hidden column that is implicitly added to a base table. The column holds ordinal numbers that are unique for each row in the table. A row id aids in identifying rows that are returned at various stages of computing a query.

This embodiment is preferable with row format because the BLOB column reduces the space that is otherwise wasted in row format. In an embodiment, when the value of a sparse column for a row is NULL, no tuple for the sparse column is stored in the composite column for the row. When a composite column is a BLOB column and sparse columns of a base table row hold mostly NULL values, the BLOB column may be small enough to be in-lined in a data block with the rest of the row.

Queries with Multiple Predicates

Often an SQL query, such as the one presented below, requests columns of a base table for each row satisfying predicates relating to multiple sparse columns.

```
SELECT *
FROM PERSON p
WHERE       p.weight > 100 AND
            p.height > 5 AND
            p.shoesize < 4 AND
            p.creditScore > 600
```

In this query, the relation instance for table person is p and the predicates are selection constraints on the weight, height, shoesize, and creditscore columns of table p, each of which was declared to be sparse when the table was created.

Figure 2:
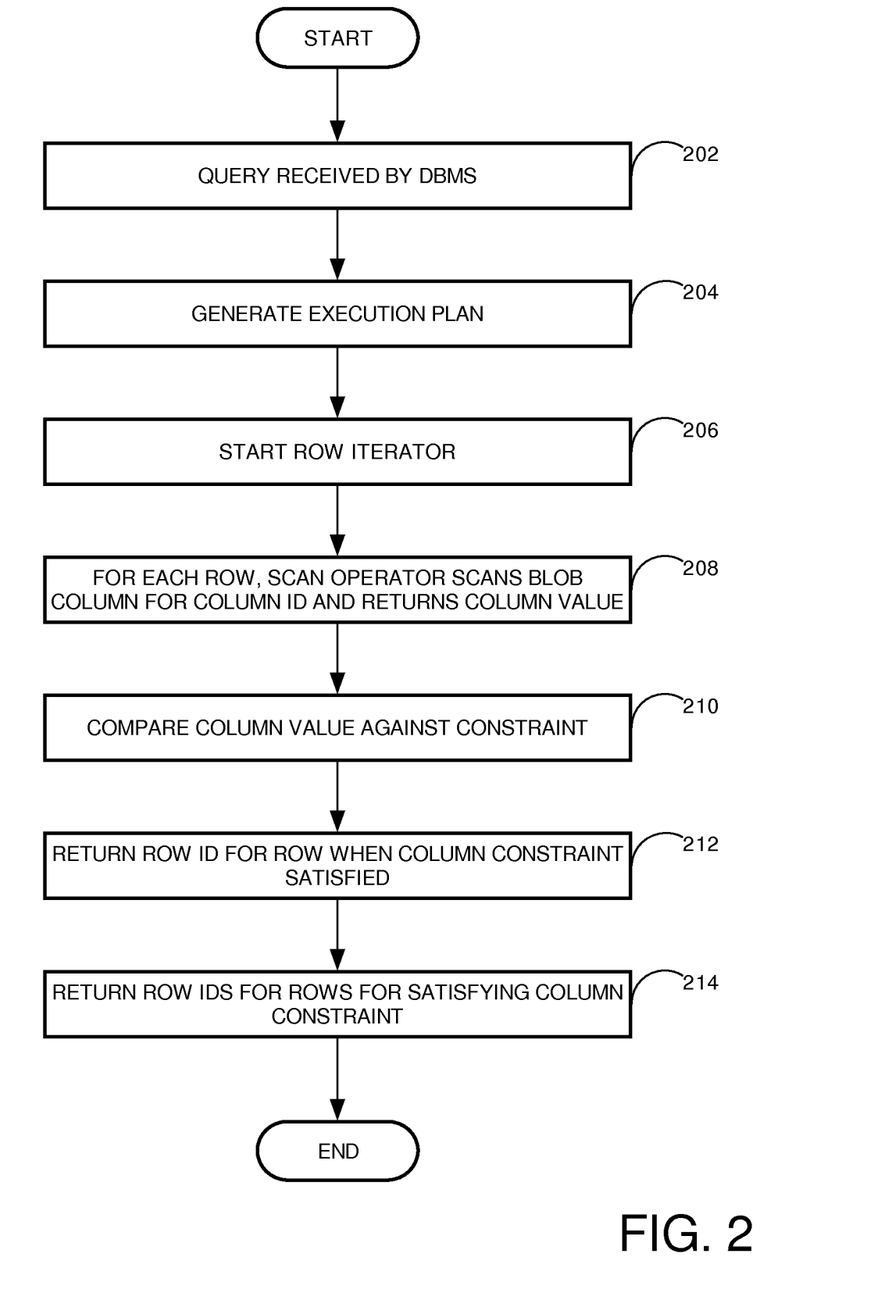
FIG. 2 depicts a flow chart of multiple sparse column scan according to an embodiment of the present invention.

According to an embodiment of the present invention, a single execution plan operator may evaluate constraints based on multiple sparse columns. FIG. 2 depicts a flow chart for executing an execution plan with such an operator. In step 202, a query is received by a DBMS. In step 204, during compilation, the system creates an execution plan having plan operators, including a scan operator that filters multiple sparse columns against constraints. During execution of the execution plan, in step 206, a row iterator generates rows from the table. For each row generated by the iterator, the scan operator searches, in step 208, the composite column for each of the sparse columns, using the column ids of the sparse columns. For every match, the scan operator obtains the value for the sparse column and compares, in step 210, the value against a query constraint if any. If all constraints are satisfied, then the scan operator returns the row id, in step 212, for the row. At the end of processing the query in step 214, the row iterator is stopped, and the row ids of all results meeting the constraints are returned.

ITAB

In another embodiment, an internal table, ITAB, is effectively used as an index on a composite column of the base table. As an index, an ITAB table enables efficient computation of queries accessing sparse columns. Preferably, rows ids are assigned to the rows of a table holding sparse columns. An ITAB table may be created and maintained by a DBMS in response to receiving one or more DDL statements declaring an index for one or more sparse columns of a base table. According to an embodiment, use of an ITAB table is not limited to use in conjunction with a composite column that holds the sparse columns.

Figure 3:
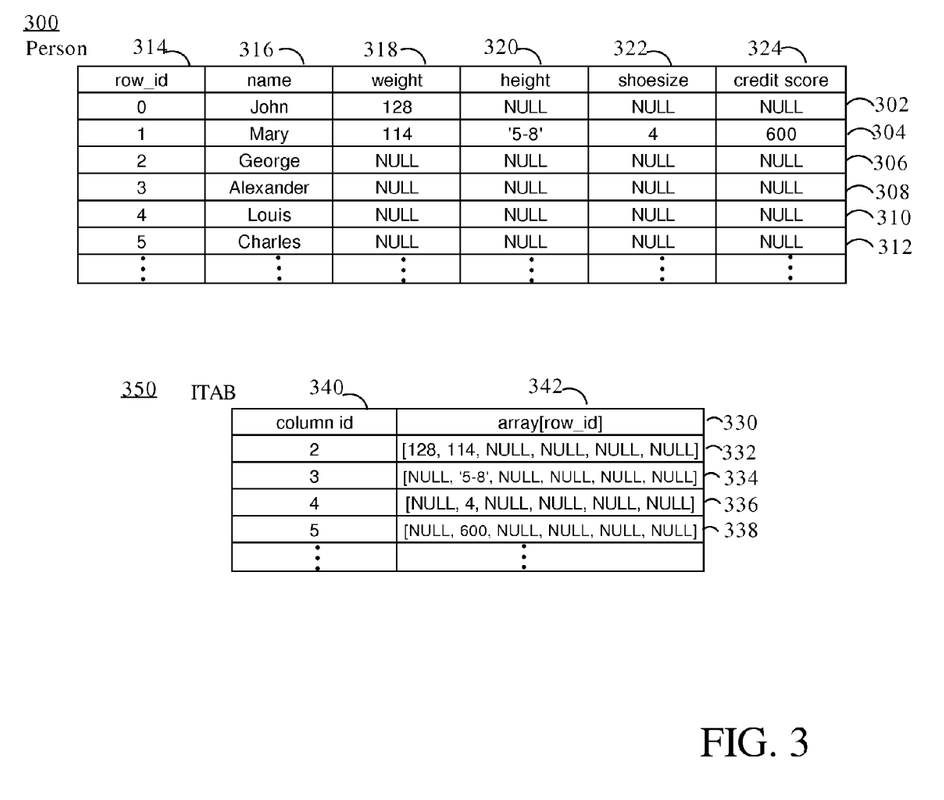
FIG. 3 depicts a typical table and an ITAB according to an embodiment of the present invention.

FIG. 3 depicts table 300 with tuples or rows 302, 304, 306, 308, 310, 312, and columns 314, 316, 318, 320, 322, 324, where columns 318, 320, 322, 324 are sparse columns. FIG. 3 also depicts ITAB 350 with four tuples 332, 334, 336, 338 and two columns 340 and 342 representing the data in the standard table 300, where each tuple includes a column-id field 340 and an array field 342. The column-id field 340 stores the column-id of a column declared to be sparse and the array field 342 contains a single dimensional array or list that is indexed by the ordinal number of the row and holds, in each entry, data for the column id and indexed row. Thus, the values in column id=2 (weight) of the standard table become entries in an array or list in the second field 342 of the tuple 332 of the ITAB.

In one version, the array is compressed, based on the data type in the column, and stored in columnar format. Compression types include dictionary encoding, run length encoding, or delta encoding depending on the data types and value distribution. Columnar compression drastically reduces the storage required for sparse columns. An array may comprise fixed size elements or variable size elements. The present invention is not limited to any particular type or implementation of an array.

Figure 4:
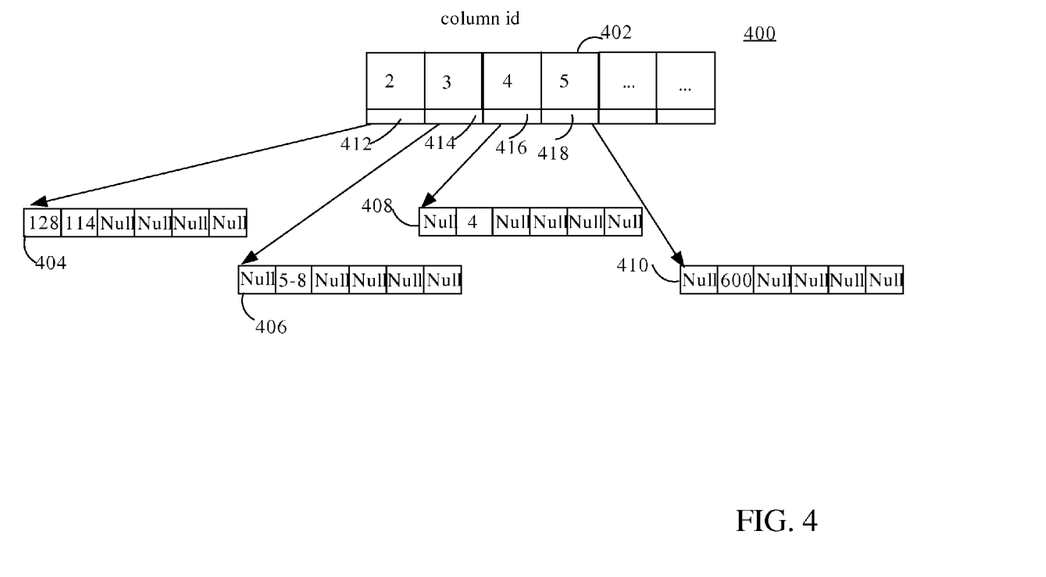
FIG. 4 depicts a coarse B+ tree index for use in an ITAB according to an embodiment of the present invention.

In one version, if there are many sparse columns, the system can create a coarse B+ tree index, as depicted in FIG. 4, on the first column of the ITAB to speed up the access of a particular sparse column by its column id. In FIG. 4, structure 402 contains the column ids and for each column id, the structure includes pointers 412, 414, 416, 418. Each pointer provides access to the list associated with a column id. For example, pointer 412 provides access to list 404, pointer 414 provides access to list 406, pointer 416 provides access to list 408, and pointer 418 provides access to list 410.

Efficiency is improved by the fact that the array index of elements in a column value array stored in the ITAB correspond to row ids of rows holding those values. A scan of a column value array for array elements having values that satisfy the value search criteria determines, for each array element, the index and thus the corresponding row id of the row in the base table having the column value in the element. The row ids returned by the scan identify the base table rows that have a column value that satisfy the search criteria.

For example, search criteria on the sparse column with column id "2" requires that a column value be less than 125. The column value array for the sparse column is stored in row 432. The column value "114" satisfies the constraint and is stored in the array at index "1", which corresponds to row-id "1" of row 404 in table 400.

Parallel Execution of Scan Operators on a Sparse Column

Figure 5:
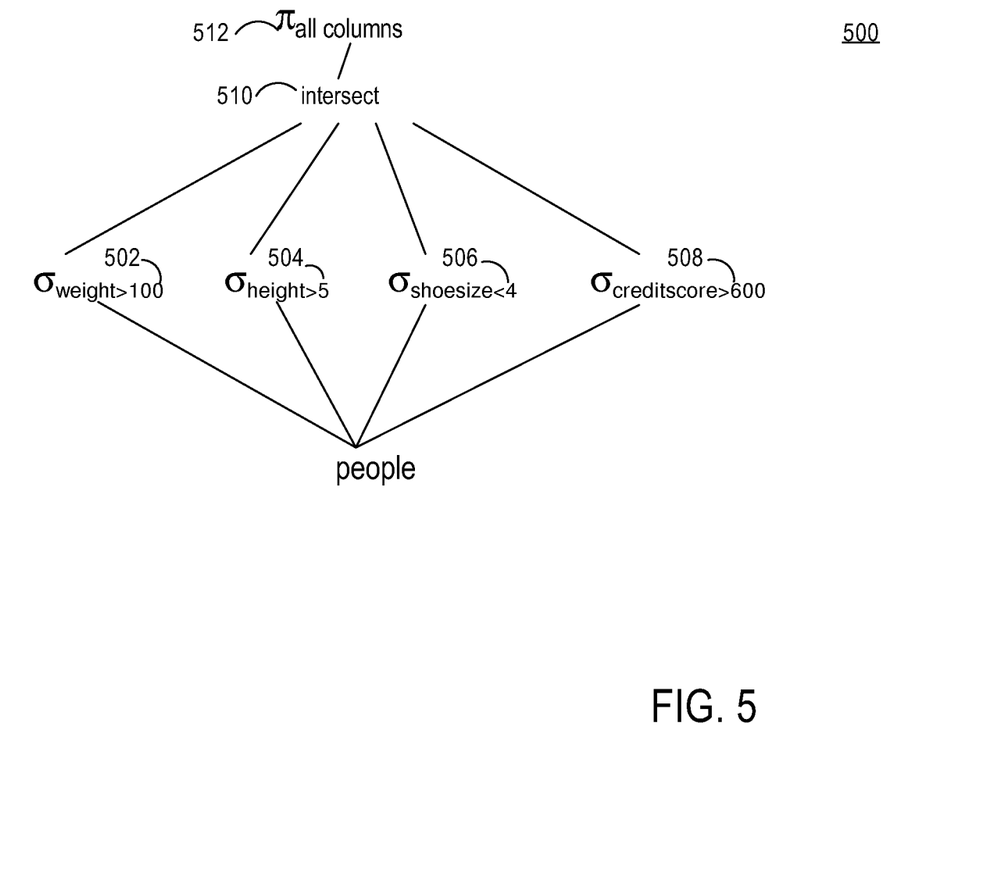
FIG. 5 depicts internal execution plan operators for a query that has constraints on the sparse columns according to an embodiment of the present invention.

To further improve efficiency, multiple sparse columns may be evaluated against constraints separately but in parallel using the ITAB. FIG. 5 depicts an execution plan with multiple execution plan operators, each of which evaluate a different sparse column against a constraint. The execution plan operators may be evaluated separately in parallel.

FIG. 5 depicts execution plan operators 502, 504, 506, 508, 510, 512 for a query, such as that stated above, which has constraints on the sparse columns. Each constraint has an execution plan operator 502, 504, 506, 508 configured to find whether a particular column value of a row meets the given constraint. In one embodiment, the operators 502, 504, 506, 508 are executed in parallel. Each operator 502, 504, 506, 508 returns rows or row ids having a column value that meets the constraint. The intersection operator 510 determines the final result among the rows returned by the operators 502, 504, 506, 508. The selection operator 512 returns all of the columns for the rows produced by the intersection operator 510, in accordance with the SELECT clause in the query.

Figure 6:
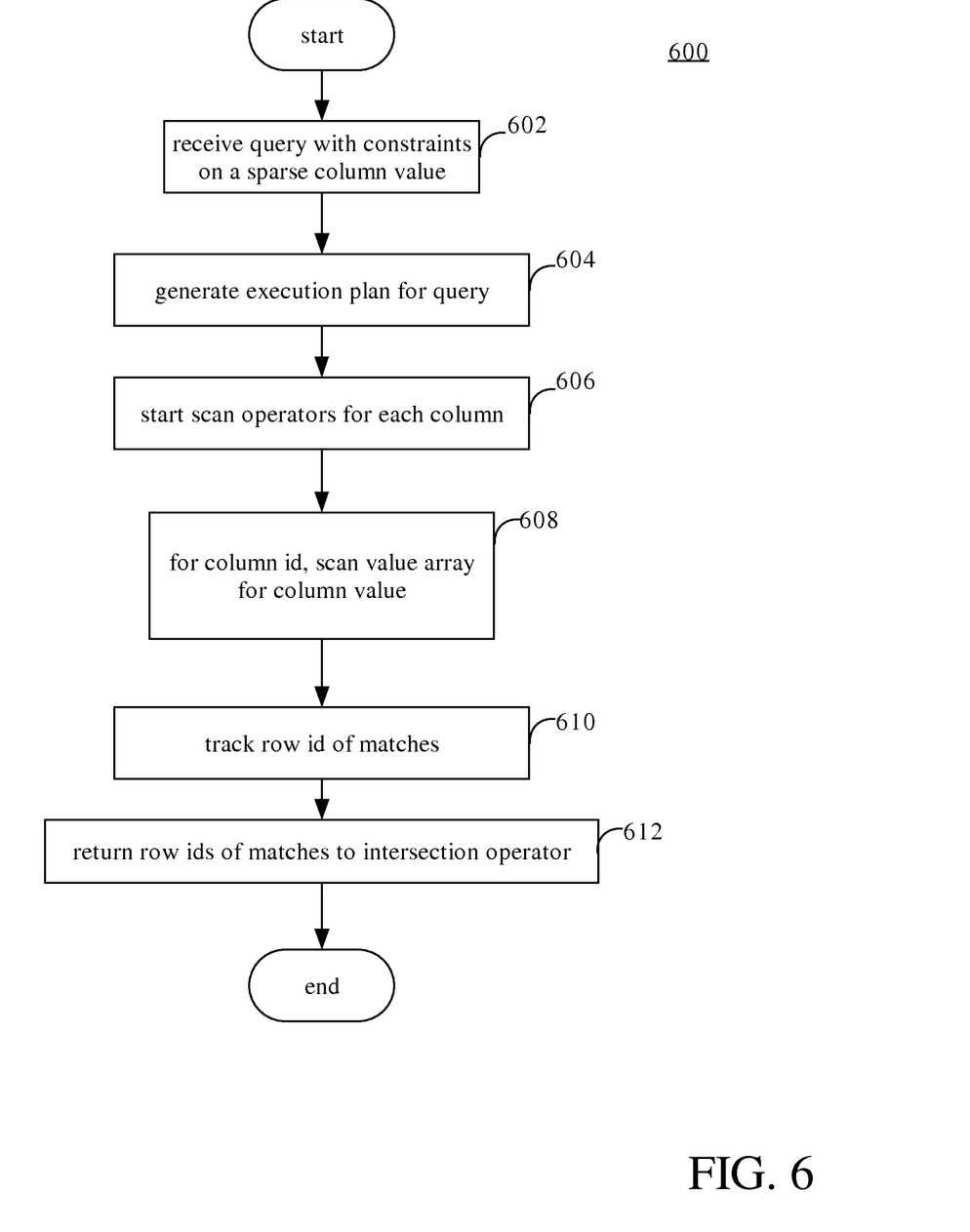
FIG. 6 depicts a flow chart of the SQL implementation with an ITAB according to an embodiment of the present invention.

FIG. 6 depicts steps for processing a query with constraints on sparse columns using an ITAB embodiment. In step 602, the query with constraints is received and in step 604 an execution plan with the execution plan operators shown in FIG. 5 is generated. In step 606, a scan operator is started for each column of the sparse columns to evaluate the column against the constraint for that column.

Each scan operator is executed in parallel and performs steps 608-612 for a sparse column. At 608, for the value array in the ITAB row having the column id of the sparse column, the value array is scanned for matches against the constraint for the column. At 610, for each match found, the row id, which is the index of the value array, is tracked. In step 612, the row ids of the columns matching the constraint are returned to intersection operator 510, which determines the final result based on the intersection between the row ids returned for all scan operators.

Additionally, after the ITAB array is loaded into memory, it can be efficiently scanned using in-memory columnar scan and range query indexing techniques.

DBMS Overview

Embodiments of the present invention are used in the context of DBMSs. Therefore, a description of a DBMS is useful.

A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is SQL. There are many different versions of SQL, some versions are standard and some proprietary, and there are a variety of extensions. DDL commands are issued to a database server to create or configure database objects, such as tables, views, or complex data types. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

A database is defined by a database dictionary. The database dictionary contains metadata that defines database objects physically or logically contained in the database. In effect, a database dictionary defines the totality of a database. Database objects include tables, columns, data types, users, user privileges, and storage structures used for storing database object data.

The database dictionary is modified according to DDL commands issued to add, modify, or delete database objects.

For example, in response to receiving a DDL statement to create table person described above, a database server alters metadata in a database dictionary to define table 100 and its columns, including hidden composite column 126. The database dictionary is also modified to define columns weight, height, shoesize, and credits core as sparse columns to associate column ids generated for these sparse columns with the sparse columns.

A database dictionary is referred to by a DBMS to determine how to execute database commands submitted to a DBMS. Thus, when a DML statement is received by a database server to insert rows with a value in a sparse column, the database server consults the database dictionary to determine that the column is sparse and stores that values according to format and techniques described above.

A DBMS receives queries issued against a database object managed by a database system. A query optimizer associated with the database system may generate one or more different candidate execution plans for a query, which are evaluated by the query optimizer to determine which execution plan should be used to compute the query.

A query execution plan defines steps for computing a query. An execution plan may be represented by a directed graph of interlinked nodes, referred to herein as plan operators, that each corresponds to a step or function of the execution plan, referred to herein as an execution plan operation. The hierarchy of the graph (i.e., directed tree) represents the order in which the execution plan operations are performed and how data flows between each of the execution plan operations. An execution plan operator may generate a set of rows as output. There are execution plan operators for performing operations such a table scan, an index scan, sort-merge join, nested-loop join, etc. According to techniques described herein, certain types of execution plan operators, when executed, read the composite column content and fetch the desired column value by decoding the column-id-value tuples stored therein, as described above.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
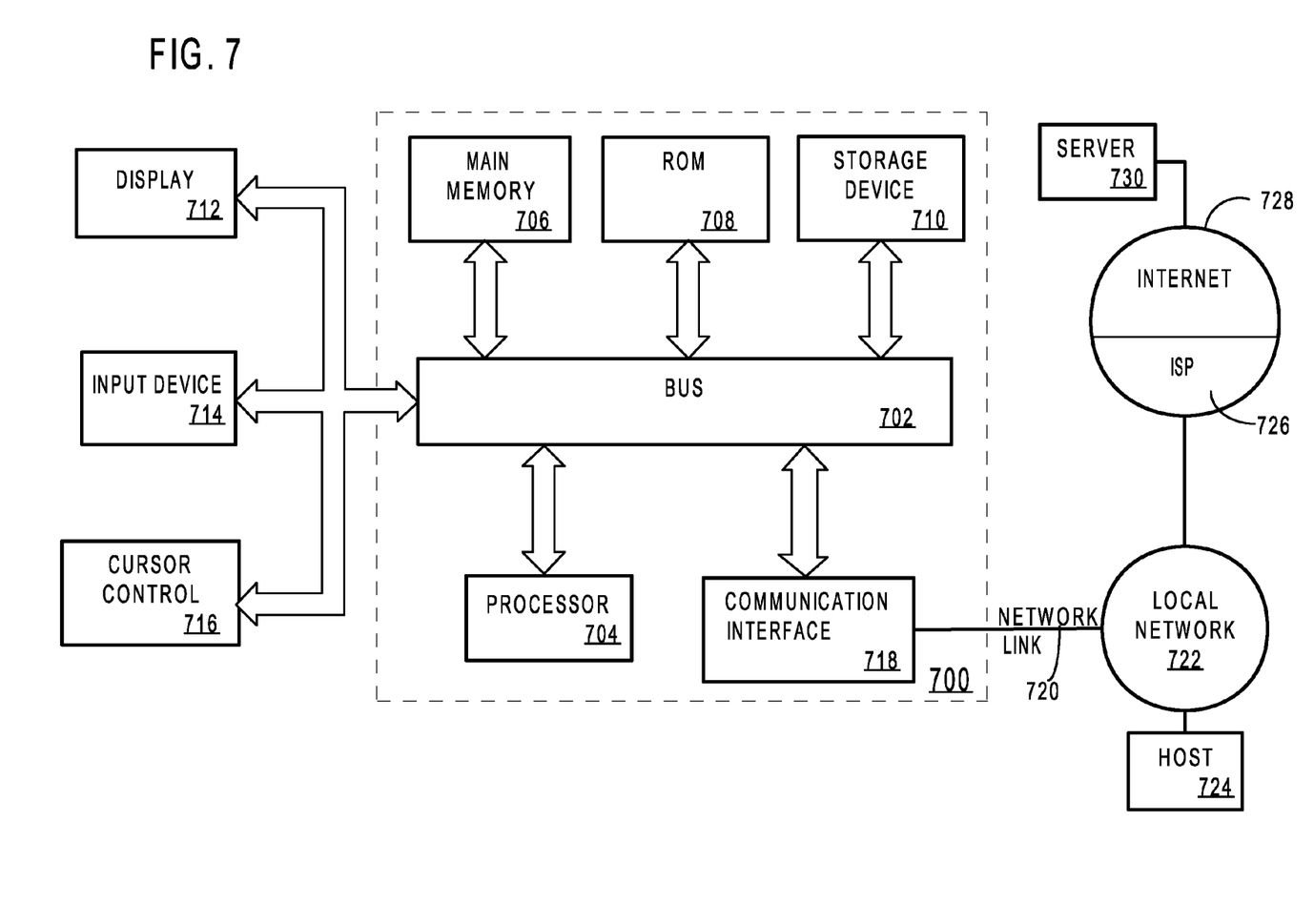
FIG. 7 depicts a system in which an embodiment may operate.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, the method comprising steps of:
computing a query requiring sparse columns of a first table that are declared to be sparse, wherein each sparse column of said sparse columns is associated with a column id of a plurality of column ids, wherein sparse column values of said each sparse column are each stored in association with the respective column id as a column-id-value pair in a composite column of said first table; and wherein computing a query comprises:
for each first table row of first table rows in said first table:
(a) using the respective column ids of the sparse columns, locating, in the composite column for said each first table row, one or more column-id-value pairs of the sparse columns;
(b) retrieving one or more respective sparse column values of said one or more column-id-value pairs; and
wherein the method is performed by one or more computing devices.

2. The method of claim 1, the steps further including:
receiving a DDL statement declaring said sparse columns as sparse;
in response to receiving said DDL statement,
creating said composite column; and
storing sparse column values for said sparse columns in said composite column.

3. The method of claim 1, wherein computing the query further comprises:
executing a query execution plan comprising one or more plan operators, wherein
executing said one or plan operators causes performance of steps (a) and (b).

4. The method of claim 1, wherein said composite column is a BLOB column.

5. The method of claim 1, wherein for a particular sparse column of said sparse columns, column-id value pairs of said particular sparse column are each stored in association with a length value indicating a length of a column value.

6. The method of claim 1, the steps further including indexing said sparse column values in an index, wherein said index comprises;
a first column that stores said plurality of column ids;
a second column that stores a plurality of column value arrays;
wherein each index row of index rows in said index includes:
in said first column, a column id of a particular sparse column of said sparse columns;
in said second column, a particular column value array of said plurality of column value arrays representing sparse column values of said particular sparse column, each element of said particular column value array having an array index that corresponds to a first table row in said first table and representing the column value of said particular sparse column for said first table row.

7. A method comprising,
a database server receiving a DDL statement declaring sparse columns of a first table as sparse;
in response to receiving a DDL statement:
associating a column id of a plurality of column ids with each sparse column of said sparse columns,
creating a second table comprising:
a first column to store said plurality of column ids;
a second column that stores a plurality of column value arrays; and
wherein each second table row of second table rows in said second table includes:
in said first column, a column id of a respective sparse column of said sparse columns;
in said second column, a respective column value array of said plurality of column value arrays representing sparse column values of said respective sparse column, each element of said respective column value array being associated with a respective array index that corresponds to a respective first table row in said first table and representing a column value of said respective sparse column for said respective first table row; and
wherein the method is performed by one or more computing devices.

8. The method of claim 7, the method further comprising:
in response to receiving said DDL statement, creating in said first table a row id column to store a plurality of ordinal row ids;
wherein for each first table row in said first table, the row id column stores a respective ordinal row id of said plurality of row ids; and
wherein for each second table row in said second table, the respective array index of each element of the respective column value array of said each second table row corresponds to the ordinal row id of the respective first table row of said each element.

9. The method of claim 8,
computing a query that specifies first criteria for a first sparse column of said sparse columns and second criteria for a second sparse column of said sparse columns;
wherein a first row in said second table corresponds to said first sparse column and stores a first column value array;
wherein a second row in said second table corresponds to said second sparse column and stores a second column value array;
wherein computing said query comprises:
generating first ordinal row ids associated with elements in said first column value array that hold a value satisfying said first criteria;
generating second ordinal row ids associated with elements in said second column value array that hold a value satisfying said second criteria;
comparing the first ordinal row ids and second ordinal row ids to determining first table rows in said first table that satisfy both said first criteria and said second criteria.

10. The method of claim 9, wherein a B+ tree index indexes said first column.

11. One or more non-transitory storage media storing instructions which, when executed by one or more computing devices, cause:
computing a query requiring sparse columns of a first table that are declared to be sparse, wherein each sparse column of said sparse columns is associated with a column id of a plurality of column ids, wherein sparse column values of said each sparse column are each stored in association with the respective column id as a column-id-value pair in a composite column of said first table; and wherein computing a query comprises:
for each first table row of first table rows in said first table:
(a) using the respective column ids of the sparse columns, locating, in the composite column for said each first table row, one or more column-id-value pairs of the sparse columns;
(b) retrieving one or more respective sparse column values of said one or more column-id-value pairs; and wherein the method is performed by one or more computing devices.

12. The one or more non-transitory storage media of claim 11, the instructions including instructions, which, when executed by said one or more computing devices, cause:
receiving a DDL statement declaring said sparse columns as sparse;
in response to receiving said DDL statement,
creating said composite column; and
storing sparse column values for said sparse columns in said composite column.

13. The one or more non-transitory storage media of claim 11, wherein computing the query further comprises:
executing a query execution plan comprising one or more plan operators, wherein
executing said one or plan operators causes performance of steps (a) and (b).

14. The one or more non-transitory storage media of claim 11, wherein said composite column is a BLOB column.

15. The one or more non-transitory storage media of claim 11, wherein for a particular sparse column of said sparse columns, column-id value pairs of said particular sparse column are each stored in association with a length value indicating a length of a column value.

16. The one or more non-transitory storage media of claim 11, the instructions including instructions, which, when executed by said one or more computing devices, cause indexing said sparse column values in an index, wherein said index comprises;
a first column that stores said plurality of column ids;
a second column that stores a plurality of column value arrays;
wherein each index row of index rows in said index includes:
in said first column, a column id of a particular sparse column of said sparse columns;
in said second column, a particular column value array of said plurality of column value arrays representing sparse column values of said particular sparse column, each element of said particular column value array having an array index that corresponds to a first table row in said first table and representing the column value of said particular sparse column for said first table row.

17. One or more non-transitory storage media storing instructions which, when executed by one or more computing devices, cause:
a database server receiving a DDL statement declaring sparse columns of a first table as sparse;
in response to receiving a DDL statement:
associating a column id of a plurality of column ids with each sparse column of said sparse columns,
creating a second table comprising:
a first column to store said plurality of column ids;
a second column that stores a plurality of column value arrays; and
wherein each second table row of second table rows in said second table includes:
in said first column, a column id of a respective sparse column of said sparse columns; and
in said second column, a respective column value array of said plurality of column value arrays representing sparse column values of said respective sparse column, each element of said respective column value array being associated with a respective array index that corresponds to a respective first table row in said first table and representing a column value of said respective sparse column for said respective first table row.

18. The one or more non-transitory storage media of claim 17, the instructions including instruction, which, when executed by said one or more computing devices, cause:
in response to receiving said DDL statement, creating in said first table a row id column to store a plurality of ordinal row ids;
wherein for each first table row in said first table, the row id column stores a respective ordinal row id of said plurality of row ids; and
wherein for each second table row in said second table, the respective array index of each element of the respective column value array of said each second table row corresponds to the ordinal row id of the respective first table row of said each element.

19. The one or more non-transitory storage media of claim 18, the instructions including instructions, which, when executed by said one or more computing devices, cause:
computing a query that specifies first criteria for a first sparse column of said sparse columns and second criteria for a second sparse column of said sparse columns;
wherein a first row in said second table corresponds to said first sparse column and stores a first column value array;
wherein a second row in said second table corresponds to said second sparse column and stores a second column value array;
wherein computing said query comprises:
generating first ordinal row ids associated with elements in said first column value array that hold a value satisfying said first criteria;
generating second ordinal row ids associated with elements in said second column value array that hold a value satisfying said second criteria;
comparing the first ordinal row ids and second ordinal row ids to determining first table rows in said first table that satisfy both said first criteria and said second criteria.

20. The one or more non-transitory storage media of claim 19, wherein a B+ tree index indexes said first column.

* * * * *